United States Patent
Ogura

(10) Patent No.: US 7,434,266 B2
(45) Date of Patent: Oct. 7, 2008

(54) REPRODUCING APPARATUS AND METHOD, AND DISK REPRODUCING APPARATUS

(75) Inventor: Masayoshi Ogura, Tokyo (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 10/398,488

(22) PCT Filed: Jul. 15, 2002

(86) PCT No.: PCT/JP02/07166

§ 371 (c)(1), (2), (4) Date: Apr. 7, 2003

(87) PCT Pub. No.: WO03/015091

PCT Pub. Date: Feb. 20, 2003

(65) Prior Publication Data

US 2004/0015711 A1 Jan. 22, 2004

(30) Foreign Application Priority Data

Aug. 8, 2001 (JP) .............................. 2001-240709

(51) Int. Cl.
*G06F 7/02* (2006.01)
(52) U.S. Cl. ..................................................... 726/30
(58) Field of Classification Search ................... 726/30, 726/31
See application file for complete search history.

(56) References Cited

U.S. PATENT DOCUMENTS 5,513,260 A * 4/1996 Ryan ........................... 380/200
5,541,997 A * 7/1996 Pappas et al. ................ 380/271
5,572,507 A * 11/1996 Ozaki et al. ............... 369/53.21
5,930,209 A * 7/1999 Spitzenberger et al. .. 369/30.05
6,289,102 B1 * 9/2001 Ueda et al. ................... 380/201
6,865,676 B1 * 3/2005 Staring et al. ............... 713/176
6,925,342 B2 * 8/2005 Hars ........................... 700/94
7,031,472 B1 * 4/2006 Noda .......................... 380/232

FOREIGN PATENT DOCUMENTS

| JP | 5-274805 | 10/1993 |
|---|---|---|
| JP | 6-236625 | 8/1994 |
| JP | 8-153331 | 6/1996 |
| JP | 2001-184654 | 7/2001 |
| WO | WO 00/52684 | 9/2000 |

* cited by examiner

*Primary Examiner*—Emmanuel L Moise
*Assistant Examiner*—David J Pearson
(74) *Attorney, Agent, or Firm*—Frommer Lawrence & Haug LLP; William S. Frommer; Thomas F. Presson

(57) ABSTRACT

A disc key detecting unit 3 detects a disc key on the basis of data which is supplied from an RF processor 1. If the disc key can be detected, a system controller 7 controls an optical pickup or the like and reproduces data of a few sectors included in an audio block portion together with data in a TOC portion. On the basis of the disc key, a data decrypting unit 4 decrypts the data in the TOC portion which is supplied from a data demodulating unit 2 and the data of a few sectors and supplies them to a data processing unit 5. The data processing unit supplies the data in the TOC portion and data in a header portion included in the sector to the system controller 7. A validity discriminating unit 8 confirms continuity of time data included in the header portion supplied from the data processing unit 5. If there is no continuity in the time data, a reproducing process or the like is suppressed.

17 Claims, 13 Drawing Sheets

REPRODUCING APPARATUS AND METHOD, AND DISK REPRODUCING APPARATUS

TECHNICAL FIELD

The invention relates to a reproducing apparatus, a reproducing method, and a disc reproducing apparatus. More particularly, the invention relates to a reproducing apparatus and a reproducing method for reproducing a recording medium on which encrypted data has been recorded and relates to a disc reproducing apparatus.

BACKGROUND ART

In recent years, in association with an increase of use of digital works, a pirated edition of a disc by an illegal copy has become a large problem. Therefore, various copyright protecting systems to prevent the illegal copy have been proposed. For example, in a super audio CD, the following copyright protecting system has been proposed.

That is, on the disc manufacturing side, data encrypted by key information (hereinafter, referred to as a disc key) is recorded onto an optical disc and the disc key used for the encryption is embedded in the optical disc. On the disc reproducing apparatus side, the disc key embedded in the optical disc is detected and the data reproduced from the optical disc is decrypted by using the detected disc key.

FIG. 1 shows a construction of a conventional disc reproducing apparatus. As shown in FIG. 1, the disc reproducing apparatus is constructed by an RF processor 201, a data demodulating unit 202, a disc key detecting unit 203, a data decrypting unit 204, a data processing unit 205, a D/A unit 206, and a system controller 207.

The RF (Radio Frequency) processor 201 executes a process such as gain control or the like to a signal read out from an optical disc by an optical pickup (not shown) and supplies it to the data demodulating unit 202 and the disc key detecting unit 203.

The data demodulating unit 202 demodulates data supplied from the RF processor 201 and supplies it to the data decrypting unit 204.

On the basis of the data supplied from the RF processor 1, the disc key detecting unit 203 detects a disc key embedded in the optical disc. When the disc key is detected, the disc key is supplied to the data decrypting unit 204.

On the basis of the disc key supplied from the disc key detecting unit 203, the data decrypting unit 204 decrypts the data supplied from the data demodulating unit 202 and supplies it to the data processing unit 205.

When data of an audio block portion is supplied from the data decrypting unit 204, the data processing unit 205 divides each sector constructing the audio block portion into a header portion and a packet portion, supplies the header portion to the system controller 207, and supplies the packet portion to the D/A unit 206. When data of a TOC (Table of Contents) portion is supplied from the data decrypting unit 204, the data processing unit 205 supplies the data of the TOC portion to the system controller 207.

The D/A unit 206 D/A converts audio data which is supplied from the data processing unit 5 and outputs it to an external apparatus or the like.

On the basis of the data in the header portion and the TOC portion supplied from the data processing unit 205, the system controller 207 displays a music number, playing time, and the like.

FIG. 2 is a flowchart for explaining a reproducing process of the conventional disc reproducing apparatus. First, in step 101, on the basis of the data supplied from the optical pickup (not shown) to the disc key detecting unit 203, the disc key detecting unit 203 detects the disc key of the optical disc loaded into the disc reproducing apparatus via the RF processor 201.

If the disc key can be detected in step 101, on the basis of the disc key detected by the disc key detecting unit 3, the data decrypting unit 204 decrypts the data which is supplied from the data demodulating unit 202 and supplies it to the data processing unit 205 in step 102.

On the other hand, if the disc key cannot be detected in step 101, an error message to notify the user of the fact that the optical disc loaded in the disc reproducing apparatus is not a legal disc is displayed in step 103.

In the conventional disc reproducing apparatus, however, whether the detected disc key coincides with the disc key used for encryption of the data or not is not confirmed. Therefore, in the conventional disc reproducing apparatus, if the recording data is decrypted in the data decrypting unit 204 by a key different from the disc key used for the encryption of the data, the time which is displayed by a display is invalid and an audio output to the external apparatus becomes an unsatisfactory noise output.

Also in the case where the disc key detecting unit 203 has erroneously discriminated the presence or absence of the disc key and the data decrypting unit 204 has decrypted the data by the wrong key, the time which is displayed by the display is invalid and the audio output to the external apparatus becomes the unsatisfactory noise output.

Further, also in the case where the data decrypting unit 204 has erroneously executed the decrypting process of the data, the time which is displayed by the display is invalid and the audio output to the external apparatus becomes the unsatisfactory noise output.

It is, therefore, the first object of the invention to provide a reproducing apparatus, a reproducing method, and a disc reproducing apparatus, in which whether a detected disc key coincides with a disc key used for encryption of data or not is discriminated and if it is confirmed that the disc key is invalid, an external output of audio data can be suppressed.

It is the second object of the invention to provide a reproducing apparatus, a reproducing method, and a disc reproducing apparatus, in which if there is an error in discrimination about the presence or absence of a disc key, an external output of audio data can be suppressed.

It is the third object of the invention to provide a reproducing apparatus, a reproducing method, and a disc reproducing apparatus, in which if data is erroneously decrypted, an external output of audio data to an external apparatus can be suppressed.

DISCLOSURE OF INVENTION

To solve the foregoing problems, according to the invention of claim 1, there is provided a reproducing apparatus for reproducing a recording medium on which main data has been divided into blocks on a unit basis of a predetermined length, address data has been allocated to each of the divided main data blocks, and both of the main data and the address data have been encrypted by predetermined key information and recorded, comprising:

reproducing means for reproducing the main data and the address data from the recording medium;

decrypting means for decrypting, by using predetermined key information, the encryption of the main data and the address data reproduced by the reproducing means;

detecting means for detecting validity of the address data decrypted by the decrypting means; and suppressing means for inhibiting an output of the main data decrypted by the decrypting means if it is determined by the detecting means that the address data decrypted by the decrypting means is invalid.

According to the invention of claim 5, there is provided a disc reproducing apparatus for reproducing a disc on which main data has been divided into blocks on a unit basis of a predetermined length, address data has been allocated to each of the divided main data blocks, and both of the main data and the address data have been encrypted by predetermined key information and recorded, comprising:

reproducing means for reproducing the main data and the address data from the disc;

decrypting means for decrypting, by using predetermined key information, the encryption of the main data and the address data reproduced by the reproducing means;

detecting means for detecting validity of the address data decrypted by the decrypting means; and control means for inhibiting an output of the main data decrypted by the decrypting means if it is determined by the detecting means that the address data decrypted by the decrypting means is invalid.

According to the invention of claim 17, there is provided a reproducing method of reproducing a recording medium on which main data has been divided into blocks on a unit basis of a predetermined length, address data has been allocated to each of the divided main data blocks, and both of the main data and the address data have been encrypted by predetermined key information and recorded, comprising:

a reproducing step of reproducing the main data and the address data from the recording medium;

a decrypting step of decrypting, by using predetermined key information, the encryption of the main data and the address data reproduced in the reproducing step;

a detecting step of detecting validity of the address data decrypted in the decrypting step; and a suppressing step of inhibiting an output of the main data decrypted in the decrypting step if it is determined in the detecting step that the address data decrypted in the decrypting step is invalid.

According to the invention of claim 1 or 17, the reproducing apparatus comprises: the reproducing means for reproducing the main data and the address data from the recording medium; the decrypting means for decrypting, by using the predetermined key information, the encryption of the main data and the address data reproduced by the reproducing means; the detecting means for detecting validity of the address data decrypted by the decrypting means; and the suppressing means for inhibiting the output of the main data decrypted by the decrypting means if it is determined by the detecting means that the address data decrypted by the decrypting means is invalid. Therefore, even if the main data is decrypted by key information different from the key information used for the encryption of the main data, it is possible to prevent unsatisfactory data from being outputted from the reproducing apparatus to an external apparatus. Even if the presence or absence of the key information is erroneously discriminated, it is possible to prevent the unsatisfactory data from being outputted from the reproducing apparatus to the external apparatus. Further, even if the decrypting means erroneously decrypts the main data, it is possible to prevent the unsatisfactory data from being outputted from the reproducing apparatus to the external apparatus.

According to the invention of claim 5, the disc reproducing apparatus comprises: the reproducing means for reproducing the main data and the address data from the disc; the decrypting means for decrypting, by using the predetermined key information, the encryption of the main data and the address data reproduced by the reproducing means; the detecting means for detecting validity of the address data decrypted by the decrypting means; and the control means for inhibiting the output of the main data decrypted by the decrypting means if it is determined by the detecting means that the address data decrypted by the decrypting means is invalid. Therefore, even if the main data is decrypted by key information different from the key information used for the encryption of the main data, it is possible to prevent unsatisfactory data from being outputted from the disc reproducing apparatus to an external apparatus. Even if the presence or absence of the key information is erroneously determined, it is possible to prevent the unsatisfactory data from being outputted from the disc reproducing apparatus to the external apparatus. Further, even if the decrypting means erroneously decrypts the main data, it is possible to prevent the unsatisfactory data from being outputted from the disc reproducing apparatus to the external apparatus.

BEST MODE FOR CARRYING OUT THE INVENTION

The first embodiment of the invention will be described hereinbelow with reference to the drawings. First, an optical disc which is loaded into a disc reproducing apparatus according to the first embodiment of the invention will be described. In the first embodiment of the invention, the optical disc is a super audio CD disc.

Figure 1:
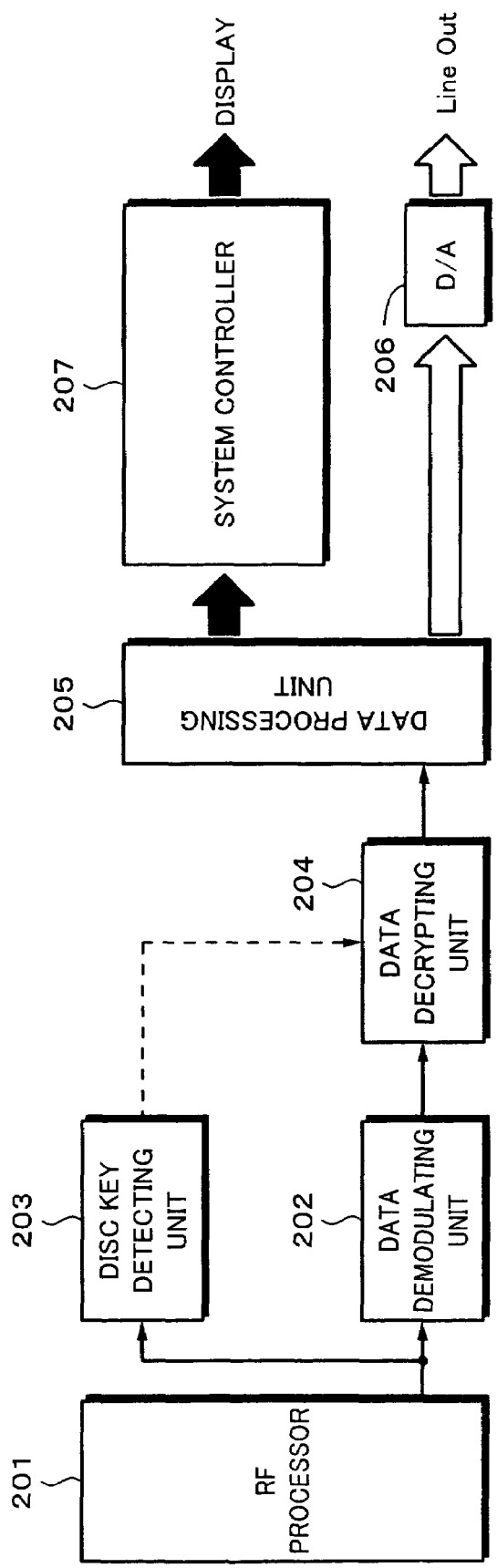
FIG. 1 is a block diagram showing a construction of a conventional reproducing apparatus.
Figure 2:
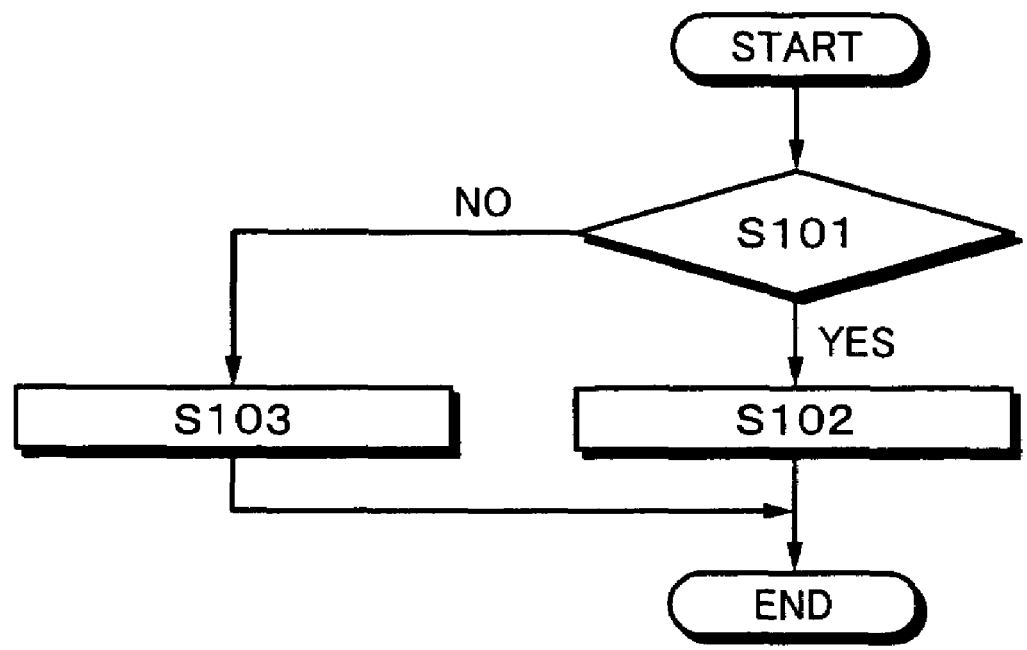
FIG. 2 is a flowchart for explaining a disc reproducing process of the conventional disc reproducing apparatus.
Figure 3A:
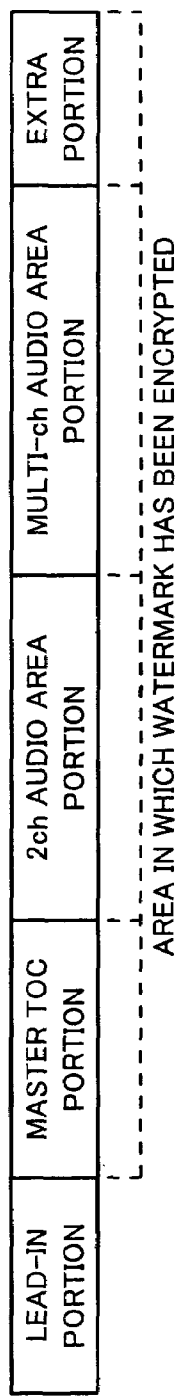
FIG. 3A is a schematic diagram showing a recording format of an optical disc according to the first embodiment of the invention.

FIG. 3A shows a recording format of the super audio CD disc. As shown in FIG. 3A, recording data of the super audio CD disc is constructed by a lead-in portion, a 2-channel audio area portion, a multichannel audio area portion, and an extra portion. A watermark has been encrypted in the areas, that is, the 2-channel audio area portion, the multichannel audio area portion, and the extra portion excluding the lead-in portion.

In the first embodiment of the invention, an example in which the recording data of the super audio CD disc has both of the 2-channel audio area portion and the multichannel audio area portion is shown. However, the recording data can also have either of those area portions.

The lead-in portion is an area on the innermost rim side and a disc key has been recorded in the lead-in portion by deforming the pit shape. The disc key is used when the disc manufacturing side encrypts the audio data which is recorded into the 2-channel audio area portion, the multichannel audio area portion, and the extra portion.

Figure 4:
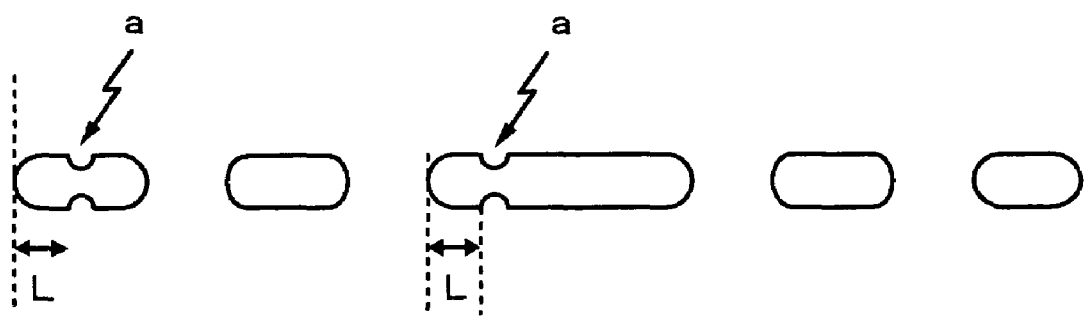
FIG. 4 is a schematic diagram showing an example of a pit shape in a lead-in portion of the optical disc according to the first embodiment of the invention.

FIG. 4 is a diagram for explaining the pit shape in the lead-in portion. A pit of a length of a period 7T (period T: one clock period of a channel clock) or more is formed so as to be away from a precedent side edge of the pit by a predetermined distance L (distance corresponding td a period 3T) as shown by an arrow a in a manner such that a width of pit is locally decreased in accordance with the data of the disc key. The disc key is recorded by such a pit width.

In the first embodiment of the invention, the pit width is modulated and the disc key is recorded with respect to the pit of the length which is equal to or larger than the period 7T. However, if a reproducing system has a sufficient allowance for a jitter of a reproduction signal or the like, the pit width can be also modulated with respect to the pit of the length which is equal to or larger than the period 6T.

Information showing the presence or absence of the 2-channel audio portion and the multichannel audio portion, a start point of each audio portion, and the like has been recorded in the master TOC portion in FIG. 3A.

As shown in FIG. B, the 2-channel audio area portion is constructed by an area TOC portion 1, an area TOC portion 2, and an audio block portion. Same information has been recorded in the area TOC portion 1 and the area TOC portion 2. Information such as a start point of a music piece recorded in the audio block portion and the like has been recorded in the area TOC portions.

Figure 3B:
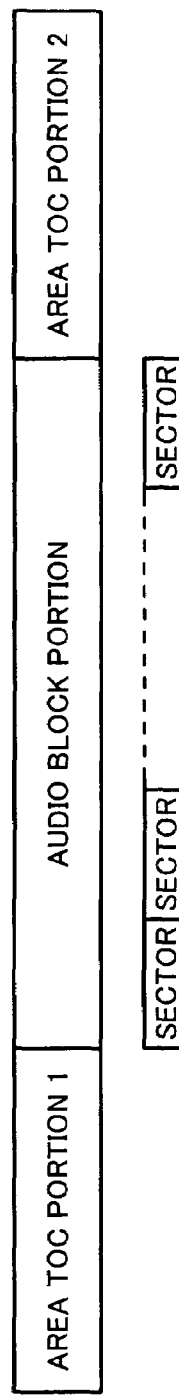
FIG. 3B is a schematic diagram showing a construction of a 2-channel audio area portion of the optical disc according to the first embodiment of the invention.
Figure 3C:
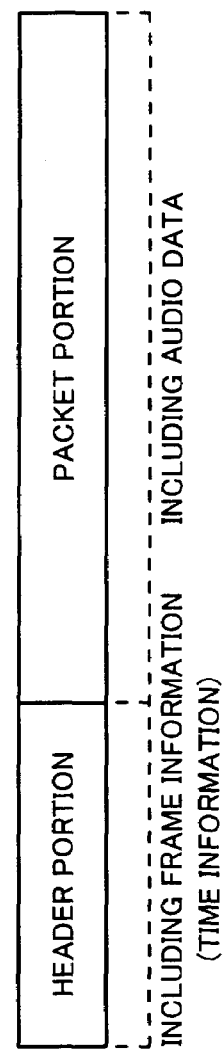
FIG. 3C is a schematic diagram showing a construction of an audio block portion of the optical disc according to the first embodiment of the invention.

The audio block portion is constructed by sectors. Each sector constructing the audio block portion is constructed by a header portion and a packet portion as shown in FIG. 3C. The header portion includes frame information constructed by time data and the like. The packet portion includes the audio data. A sector format shown in FIG. 3C indicates an image obtained after decryption.

Since the multichannel audio area portion has a construction similar to that of the 2-channel audio area portion, its description is omitted here.

For example, a video clip, text information, graphics, and the like can be recorded into the extra portion.

Figure 5:
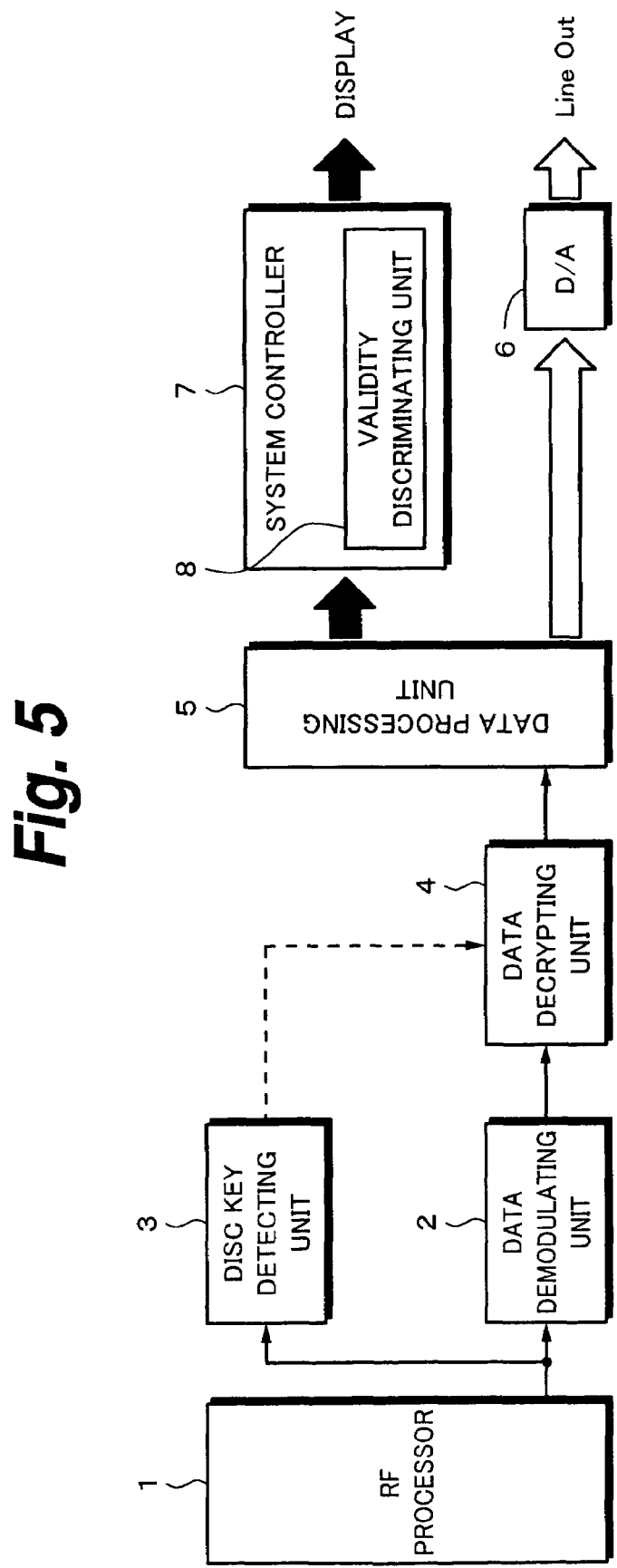
FIG. 5 is a block diagram showing an example of a construction of a disc reproducing apparatus according to the first embodiment of the invention.

FIG. 5 is a schematic diagram showing an example of a construction of the disc reproducing apparatus according to the first embodiment of the invention. As shown in FIG. 5, the disc reproducing apparatus according to the first embodiment of the invention comprises an RF processor 1, a data demodulating unit 2, a disc key detecting unit 3, a data decrypting unit 4, a data processing unit 5, a D/A unit 6, and a system controller 7.

The RF (Radio Frequency) processor 1 executes a process such as gain control or the like to a signal read out from the optical disc by an optical pickup (not shown) and supplies it to the data demodulating unit 2 and the disc key detecting unit 3.

The data demodulating unit 2 demodulates the data supplied from the RF processor 1 and supplies it to the data decrypting unit 4.

On the basis of the data supplied from the RF processor 1, the disc key detecting unit 3 detects a disc key embedded in the optical disc. When the disc key is detected, the disc key is supplied to the data decrypting unit 4.

On the basis of the disc key supplied from the disc key detecting unit 3, the data decrypting unit 4 decrypts the data supplied from the data demodulating unit 2 and supplies it to the data processing unit 5.

When data of the audio block portion is supplied from the data decrypting unit 4, the data processing unit 5 divides each sector constructing the audio block portion into a header portion and a packet portion, supplies the header portion to the system controller 7, and supplies the packet portion to the D/A unit 6. When data of a TOC portion is supplied from the data decrypting unit 4, the data processing unit 5 supplies the data of the TOC portion to the system controller 7.

The D/A converting unit 6 D/A converts audio data which is supplied from the data processing unit 5 and outputs it to an external apparatus or the like.

On the basis of the data in the header portion and the TOC portion supplied from the data processing unit 5, the system controller 7 displays a music number indicative of the number of music pieces, playing time, and the like. If an optical disc is loaded into the disc reproducing apparatus, the system controller 7 controls the optical pickup and a spindle motor (not shown), reads out the information in the lead-in portion of the optical disc, and controls the disc key detecting unit 3 so as to detect the disc key. If the disc key is detected in the disc key detecting unit 3, the system controller 7 controls the optical pickup and the spindle motor (not shown) and reads out the data of, for example, a few sectors in the audio block portion subsequent to the TOC portion together with the data in the TOC portion.

The system controller 7 has a validity discriminating unit 8. The validity discriminating unit 8 discriminates validity of the time data included in the audio block portion which is supplied from the data processing unit 5. For example, the validity discriminating unit 8 discriminates validity of the time data included in the time data of a few sectors included in the audio block portion. In the first embodiment of the invention, the discrimination of the validity of the time data is made on the basis of whether the time data is continuous or not or whether it is equal to a value in a valid range or not.

If it is determined that the time data is invalid, the validity discriminating unit 8 allows an error message for notifying the user of the fact that the disc is invalid to be displayed on a display and suppresses a subsequent reproducing process or the like.

As mentioned above, in the validity discriminating unit 8, by discriminating the validity of the time data, whether the disc key detected in the disc key detecting unit 3 is valid or not can be discriminated. This is because if the data is decrypted by the wrong disc key, the time data is not decrypted to a proper value.

If it is determined that the time data is invalid, the validity discriminating unit 8 can also allow the audio data outputted from the data processing unit 5 to be muted between the data processing unit 5 and the D/A unit 6. Further, the audio data outputted from the data processing unit 5 can be also muted in the data processing unit 5. Moreover, the audio data outputted from the data processing unit 5 can be also muted in the D/A unit 6. If an amplifier is connected to the D/A unit 6, the audio data outputted from the data processing unit 5 can be also muted between the D/A unit 6 and the amplifier or in the amplifier. If optical output terminals are provided for the data processing unit 5 and the D/A unit 6, the audio data outputted from the data processing unit 5 is muted in the data processing unit 5.

Figure 6:
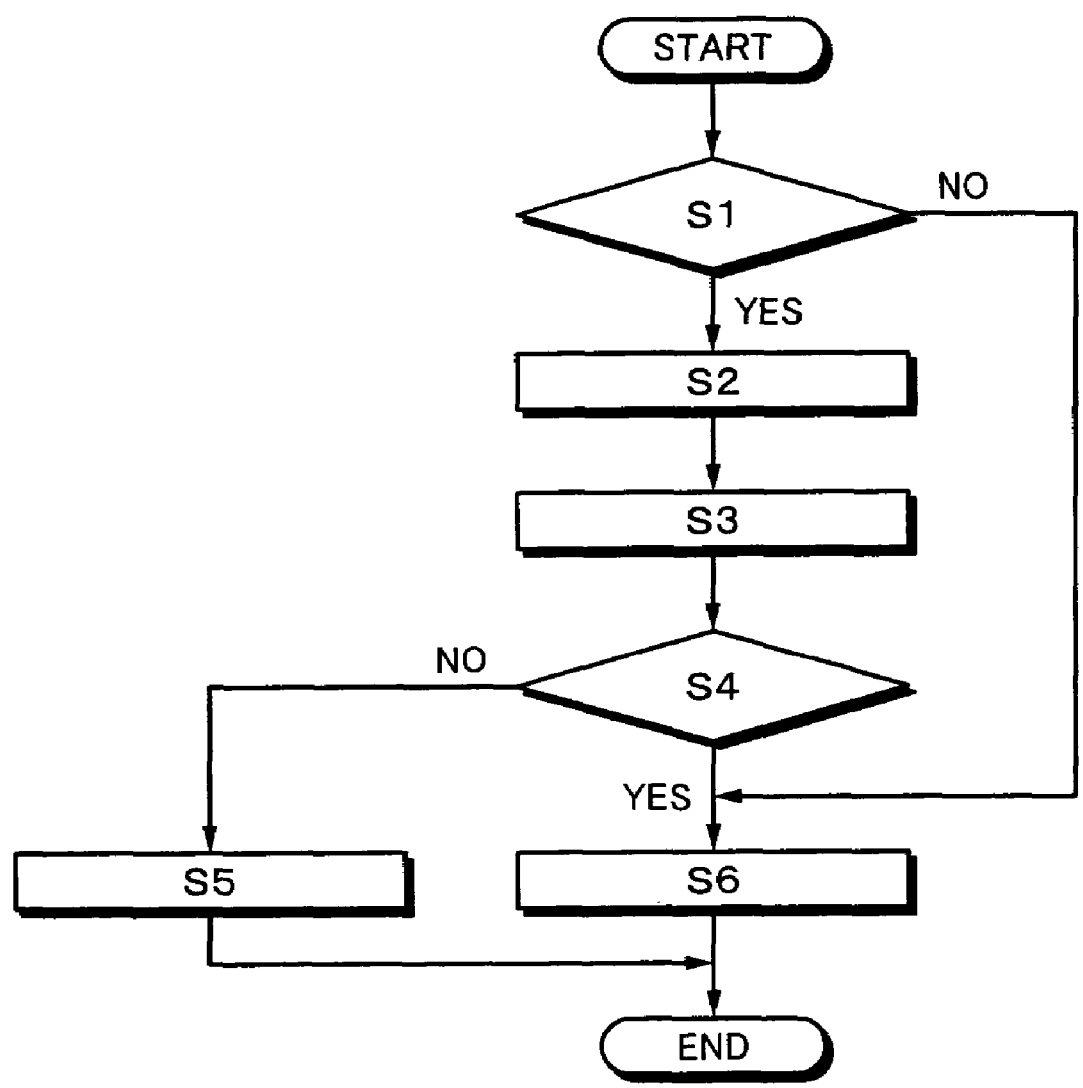
FIG. 6 is a flowchart for explaining a disc reproducing process of the disc reproducing apparatus according to the first embodiment of the invention.

FIG. 6 is a flowchart for explaining are producing process of the disc reproducing apparatus according to the first embodiment of the invention. First, in step 1, on the basis of the data which is supplied from the optical pickup (not shown) to the disc key detecting unit 3 via the RF processor 1, the disc key detecting unit 3 detects the disc key of the optical disc loaded in the disc reproducing apparatus. If the disc key can be detected, the processing routine advances to next step 2. If the disc key cannot be detected, step 6 follows.

Subsequently, in step 2, the system controller 7 controls the optical pickup and the spindle motor (not shown) and reads out the data of, for example, a few sectors in the audio block portion subsequent to the TOC portion together with the data in the TOC portion.

Subsequently, in step 3, on the basis of the disc key detected by the disc key detecting unit 3, the data decrypting unit 4 decrypts the data of, for example, a few sectors in the audio block portion together with the data in the TOC portion which is supplied from the data demodulating unit 2 and supplies it to the data processing unit 5.

Subsequently, in step 4, on the basis of the time data supplied from the data processing unit 5, the validity discriminating unit 8 discriminates the validity of the time data.

If the time data is valid, in step 5, the signal outputted from the data processing unit 5 is D/A converted by the D/A unit 6 and outputted to the external apparatus.

If the time data is invalid, in step 6, the validity discriminating unit 8 allows the error message for notifying the user of the fact that the disc is invalid to be displayed on the display and suppresses a subsequent reproducing process or the like.

As mentioned above, according to the first embodiment of the invention, the validity discriminating unit 8 discriminates the validity of the decrypted time data. If it is determined that the time data is invalid, since the reproducing process or the like of the disc reproducing apparatus is suppressed, even if the recording data is decrypted by a key different from the disc key used for the encryption of the data, it is possible to prevent unsatisfactory noises from being outputted from the reproducing apparatus to the external apparatus. Also in the case where the disc key detecting unit 3 erroneously discriminates the presence or absence of the disc key, it is possible to prevent unsatisfactory noises from being outputted from the reproducing apparatus to the external apparatus. Therefore, since grace and quality of the reproducing apparatus are not lost due to the unsatisfactory noise output, the user can use the reproducing apparatus at ease.

Verification about whether the disc key used for the decryption is the same key as the disc key used for the encryption of the data or not can be made on the basis of the validity of the encrypted time data instead of the disc key itself. That is, merely by providing a program for discriminating the validity of the time data for the system controller 7 of the disc reproducing apparatus instead of providing a complicated decoding circuit of a large scale for verifying the disc key for the reproducing apparatus, the disc key can be verified. Therefore, the reproducing apparatus which can discriminate the validity of the disc key can be easily embodied at low costs.

Subsequently, the second embodiment of the invention will be described. In the foregoing first embodiment, the example of discriminating whether the disc key is valid or not has been shown. In the second embodiment of the invention, however, an example of discriminating whether the data decrypted in the decrypting unit is valid or not is shown.

Figure 7:
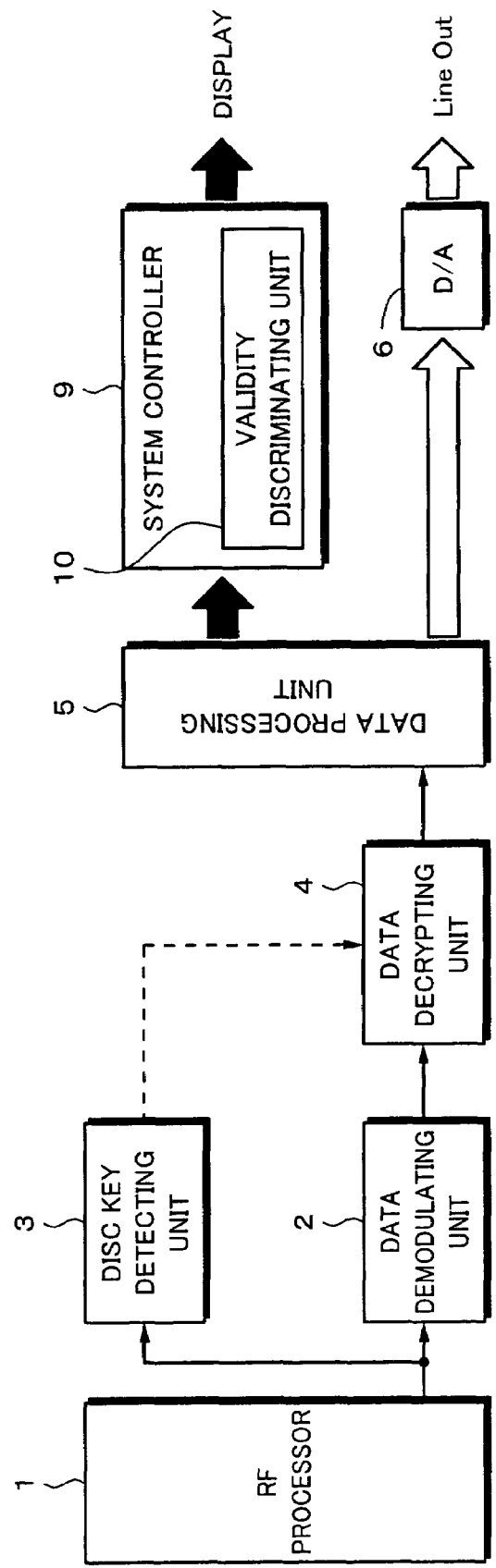
FIG. 7 is a block diagram showing an example of a construction of a disc reproducing apparatus according to the second embodiment of the invention.

FIG. 7 is a block diagram showing an example of a construction of a disc reproducing apparatus according to the second embodiment of the invention. As shown in FIG. 7, the disc reproducing apparatus according to the second embodiment of the invention comprises the RF processor 1, data demodulating unit 2, disc key detecting unit 3, data decrypting unit 4, data processing unit 5, D/A unit 6, and a system controller 9. Portions common to those in the disc reproducing apparatus according to the first embodiment are designated by the same reference numerals and their detailed descriptions are omitted.

Since an optical disc which is loaded into the disc reproducing apparatus is similar to that shown in the first embodiment mentioned above, its explanation is omitted.

The system controller 9 displays a music number indicative of the number of music pieces, playing time, and the like on the basis of the data in the header portion and the TOC portion which is supplied from the data processing unit 5. If an optical disc is loaded into the disc reproducing apparatus, the system controller 9 controls the optical pickup and the spindle motor (not shown), reads out the information in the lead-in portion of the optical disc, and controls the disc key detecting unit 3 so as to detect the disc key. If the disc key is detected in the disc key detecting unit 3, the system controller 9 controls the optical pickup and the spindle motor (not shown) and reads out the data in the TOC portion. After that, if reproduction is instructed by the user, the system controller 9 reads out, for example, the data in the audio block portion.

The system controller 9 has a validity discriminating unit 10. The validity discriminating unit 10 discriminates validity of the time data included in the audio block portion which is supplied from the data processing unit 5. For example, the validity discriminating unit 10 discriminates validity of the time data of a few sectors included in the audio block portion. In the second embodiment of the invention, the discrimination of the validity of the time data is made on the basis of whether the time data is continuous or not or whether it is equal to a value in a valid range or not.

If it is determined that the time data is invalid, the validity discriminating unit 10 allows the audio data outputted from the data processing unit 5 to be muted between the data processing unit 5 and the D/A unit 6 and allows an error message for notifying the user of the fact that the decrypted data is invalid to be displayed on the display.

By discriminating the validity of the time data in the validity discriminating unit 10 as mentioned above, whether the data decrypted in the data decrypting unit 4 is valid or not can be confirmed. This is because, as shown in FIG. 3, since the time data and the audio data are component elements of the audio block portion and have been encrypted by the same disc key and recorded, if they are decrypted by the wrong disc key, the audio data is not decrypted to the proper value in a manner similar to the time data.

In the second embodiment of the invention, the example in which the audio data outputted from the data processing unit 5 is muted between the data processing unit 5 and the D/A unit 6 has been shown. However, the audio data outputted from the data processing unit 5 can be also muted in the data processing unit 5. The audio data outputted from the data processing unit 5 can be also muted in the D/A unit 6. Further, if an amplifier is connected to the D/A unit 6, the audio data outputted from the data processing unit 5 can be also muted between the D/A unit 6 and the amplifier or in the amplifier. If optical output terminals are provided for the data processing unit 5 and the D/A unit 6, the audio data outputted from the data processing unit 5 is muted in the data processing unit 5.

Figure 8:
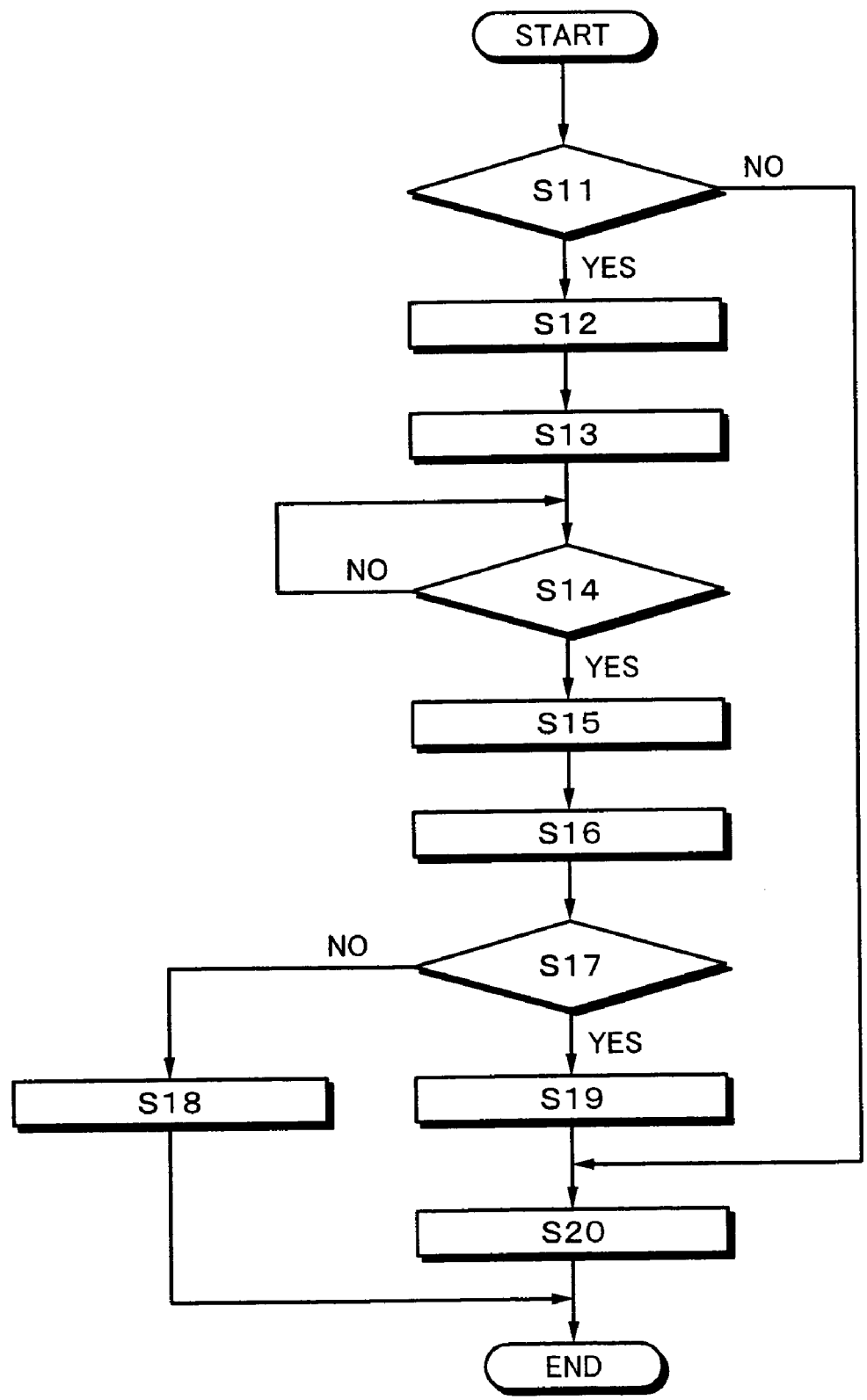
FIG. 8 is a flowchart for explaining a disc reproducing process of the disc reproducing apparatus according to the second embodiment of the invention.

FIG. 8 is a flowchart for explaining a reproducing process of the disc reproducing apparatus according to the second embodiment of the invention. First, in step 11, on the basis of the data which is supplied from the optical pickup (not shown) to the disc key detecting unit 3 via the RF processor 1, the disc key detecting unit 3 detects the disc key of the optical disc loaded in the disc reproducing apparatus. If the disc key can be detected, the processing routine advances to next step 12. If the disc key cannot be detected, step 20 follows.

Subsequently, in step 12, the system controller 9 controls the optical pickup and the spindle motor (not shown) and reads out the data in the TOC portion.

Subsequently, in step 13, on the basis of the disc key detected by the disc key detecting unit 3, the data decrypting unit 4 decrypts the data in the TOC portion which is supplied from the data demodulating unit 2 and supplies it to the data processing unit 5.

Subsequently, in step 14, the system controller 9 discriminates whether the reproduction has been instructed by an operating unit (not shown) connected to the system controller 9 or not. If the reproduction is instructed, next step 15 follows.

Subsequently, in step 15, the system controller 9 controls the optical pickup and the spindle motor (not shown) and reads out the data in the audio block portion.

Subsequently, in step 16, the data in the audio block portion read out by the optical pickup is demodulated in the data demodulating unit 2, decrypted in the data decrypting unit 4, and supplied to the data processing unit 5.

Subsequently, in step 17, on the basis of the time data supplied from the data processing unit 5, the system controller 9 discriminates the validity of the time data.

If the time data is valid, in step 18, the data outputted from the data processing unit 5 is D/A converted by the D/A unit 6 and outputted to the external apparatus.

If the time data is invalid, in step 19, the validity discriminating unit 10 allows the audio data outputted from the data processing unit 5 to be muted between the data processing unit 5 and the D/A unit 6 and allows the error message for notifying the user of the fact that the decrypted data is invalid to be displayed on the display in step 20.

In the example as mentioned above, the case where the validity discriminating unit 10 discriminates whether the disc key is valid or not on the basis of the time data included in the audio block portion has been shown. However, the validity discriminating unit 10 can also discriminate whether the disc key is valid or not on the basis of the decrypted data in the TOC portion in step 103. For example, the validity discriminating unit 10 discriminates whether the disc key is valid or not on the basis of whether the music number increases continuously or not.

As mentioned above, according to the second embodiment of the invention, the validity discriminating unit 10 discriminates the validity of the decrypted time data and, if it is determined to be invalid, the output of the decrypted audio data is suppressed. Therefore, also in the case where the recording data has been decrypted by a key different from the disc key used for the encryption of the data, it is possible to prevent the unsatisfactory noises from being outputted from the disc reproducing apparatus to the external apparatus. Even if the disc key detecting unit 3 erroneously determines the presence or absence of the disc key, it is possible to prevent the unsatisfactory noises from being outputted from the disc reproducing apparatus to the external apparatus. Further, even if the data decrypting unit 4 erroneously decrypts the data, it is possible to prevent the unsatisfactory noises from being outputted from the disc reproducing apparatus to the external apparatus. Therefore, since grace and quality of the disc reproducing apparatus are not lost due to the unsatisfactory noise output, the user can use the disc reproducing apparatus at ease.

Verification about whether the disc key used for the decryption is the same key as the disc key used for the encryption of the data or not can be made on the basis of the validity of the encrypted time data instead of the disc key itself. That is, merely by providing the program for discriminating the validity of the time data for the system controller 9 of the disc reproducing apparatus instead of providing the complicated decoding circuit of a large scale for verifying the disc key for the disc reproducing apparatus, the disc key can be verified. Therefore, the disc reproducing apparatus which can discriminate the validity of the disc key can be easily embodied at low costs.

Subsequently, the third embodiment of the invention will be described. In the foregoing first embodiment, the example of discriminating the validity of the disc key on the basis of the continuity of the time data read out from the audio block portion has been shown. In the third embodiment of the invention, however, an example of discriminating the validity of the disc key on the basis of whether the time data read out from a predetermined position on the disc is the time data which has inherently been recorded at such a position or not is shown.

Figure 9:
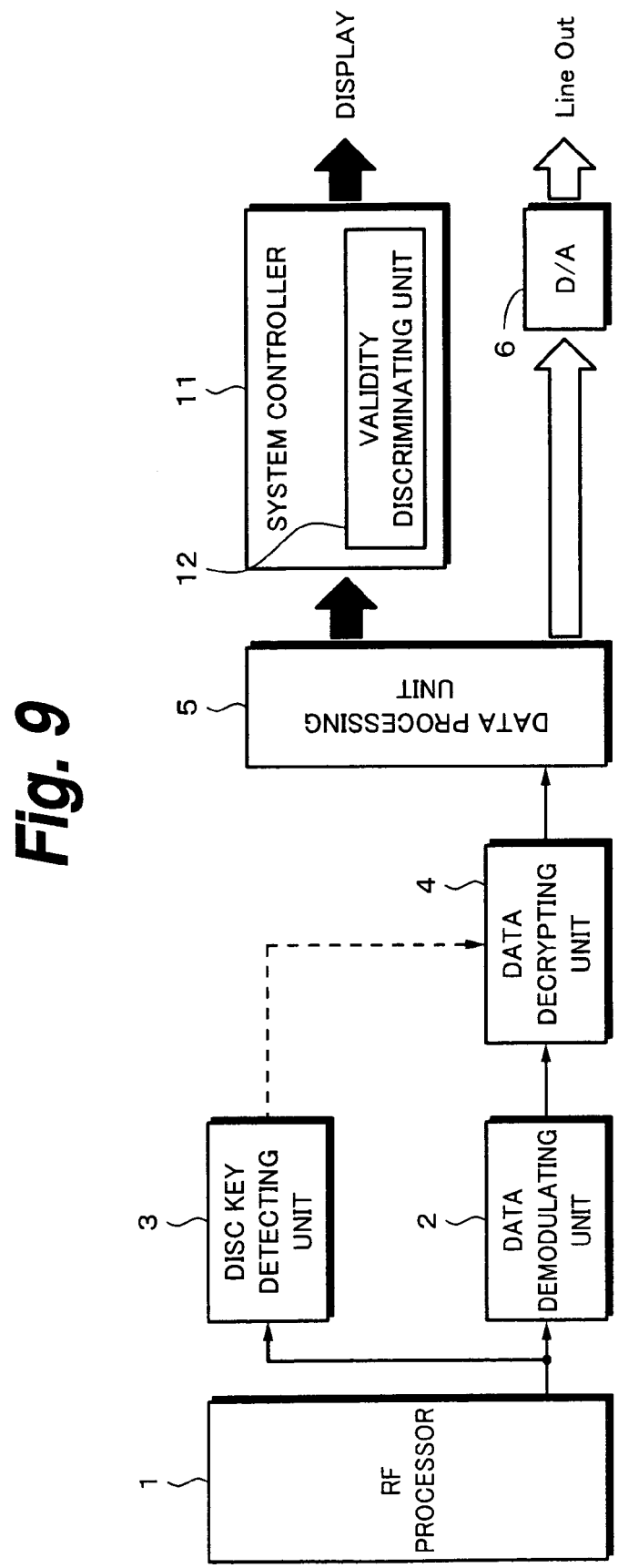
FIG. 9 is a block diagram showing an example of a construction of a disc reproducing apparatus according to the third embodiment of the invention.

FIG. 9 is a block diagram showing an example of a construction of a disc reproducing apparatus according to the third embodiment of the invention. As shown in FIG. 9, the disc reproducing apparatus according to the third embodiment of the invention comprises the RF processor 1, data demodulating unit 2, disc key detecting unit 3, data decrypting unit 4, data processing unit 5, D/A unit 6, and a system controller 11. Portions common to those in the disc reproducing apparatus according to the first embodiment are designated by the same reference numerals and their detailed descriptions are omitted.

Since an optical disc which is loaded into the disc reproducing apparatus is similar to that shown in the first embodiment mentioned above, its explanation is omitted.

When the optical disc is loaded into the disc reproducing apparatus, the system controller 11 reads out the information in the lead-in portion and controls the disc key detecting unit 3 so as to detect the disc key. When the disc key is detected in the disc key detecting unit 3, the system controller 11 controls the optical pickup and the spindle motor (not shown), reads out the TOC portion data, and reads out data at a predetermined position. The predetermined position is a position which has been predetermined in the audio block portion on the optical disc.

The system controller has a validity discriminating unit 12. The validity discriminating unit 12 discriminates whether the time data at the predetermined position which is supplied from the data processing unit 5 is the time data which has inherently been recorded at the predetermined position on the optical disc or not. Although the validity discriminating unit 12 discriminates whether the time data is the time data which has inherently been recorded at the predetermined position on the disc or not on the basis of the time data included in one sector, it can be also discriminated on the basis of the time data of a few sectors.

If it is determined that the time data is invalid, the validity discriminating unit 12 allows an error message for notifying the user of the fact that the disc is invalid to be displayed on the display and suppresses the subsequent reproducing process or the like.

By discriminating the validity of the time data in the validity discriminating unit 12 as mentioned above, whether the disc key detected in the disc key detecting unit 3 is valid or not can be confirmed. This is because if the data is decrypted by the wrong disc key, the time data cannot be decrypted to the valid value.

If the validity discriminating unit 12 determines that the time data is invalid, the audio data outputted from the data processing unit 5 can be muted between the data processing unit 5 and the D/A unit 6. Further, the audio data outputted from the data processing unit 5 can be also muted in the data processing unit 5. Moreover, the audio data outputted from the data processing unit 5 can be also muted in the D/A unit 6. If an amplifier is connected to the D/A unit 6, the audio data outputted from the data processing unit 5 can be also muted between the D/A unit 6 and the amplifier or in the amplifier. If optical output terminals are provided for the data processing unit 5 and the D/A unit 6, the audio data outputted from the data processing unit 5 is muted in the data processing unit 5.

Figure 10:
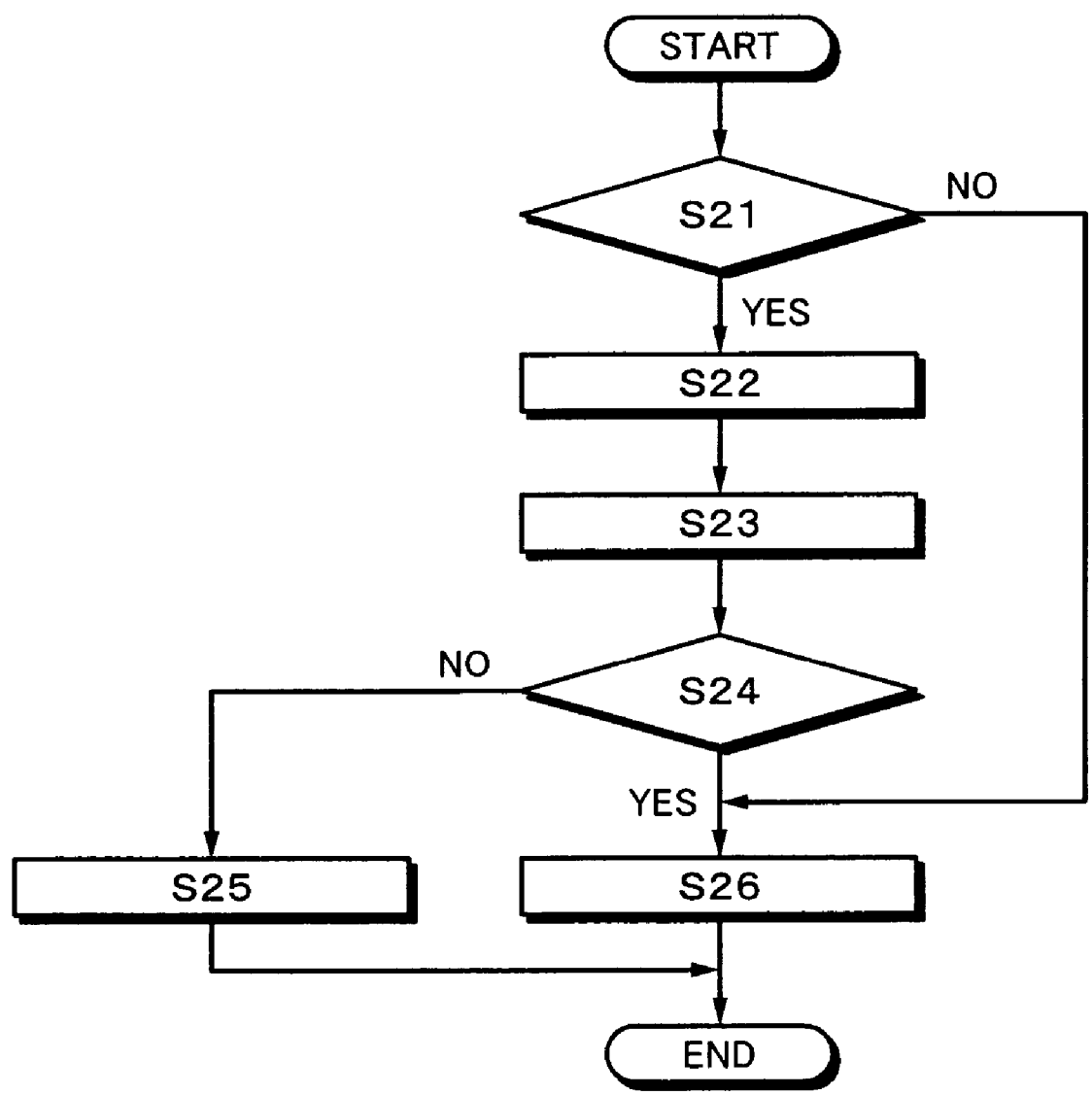
FIG. 10 is a flowchart for explaining a disc reproducing process of the disc reproducing apparatus according to the third embodiment of the invention.

FIG. 10 is a flowchart for explaining are producing process of the disc reproducing apparatus according to the third embodiment of the invention. First, in step 21, on the basis of the data which is supplied from the optical pickup (not shown) to the disc key detecting unit 3 via the RF processor 1, the disc key detecting unit 3 detects the disc key of the optical disc loaded in the disc reproducing apparatus. If the disc key can be detected, the processing routine advances to next step 22. If the disc key cannot be detected, step 26 follows.

Subsequently, in step 22, the system controller 11 controls the optical pickup and the spindle motor (not shown), reads out the data in the TOC portion, and reads out data at a predetermined position.

Subsequently, in step 23, on the basis of the disc key detected by the disc key detecting unit 3, the data decrypting unit 4 decrypts the data in the TOC portion which is supplied from the data demodulating unit 2 and the data at the predetermined position, and supplies them to the data processing unit 5.

Subsequently, in step 24, the validity discriminating unit 12 discriminates whether the time data at the predetermined position which is supplied from the data processing unit 5 is the time data which has inherently been recorded at the predetermined position on the optical disc or not.

If the time data is valid, in step 25, the data outputted from the data processing unit 5 is D/A converted in the D/A unit 6 and outputted to the external apparatus.

If the time data is invalid, in step 26, the validity discriminating unit 12 allows the error message for notifying the user of the fact that the disc is invalid to be displayed on the display and suppresses a subsequent reproducing process or the like.

If the validity discriminating unit 12 determines that the time data is invalid, the audio data outputted from the data processing unit 5 can be muted between the data processing unit 5 and the D/A unit 6. Further, the audio data outputted from the data processing unit 5 can be also muted in the data processing unit 5. Moreover, the audio data outputted from the data processing unit 5 can be also muted in the D/A unit 6. If an amplifier is connected to the D/A unit 6, the audio data outputted from the data processing unit 5 can be also muted between the D/A unit 6 and the amplifier or in the amplifier. If optical output terminals are provided for the data processing unit 5 and the D/A unit 6, the audio data outputted from the data processing unit 5 is muted in the data processing unit 5.

Advantages similar to those in the first embodiment can be also obtained by the third embodiment.

The fourth embodiment of the invention will now be described. In the foregoing first embodiment, the example in which the invention is applied to the disc reproducing apparatus for reproducing the super audio CD disc has been shown. However, in the third embodiment of the invention, an example in which the invention is applied to the disc reproducing apparatus for reproducing a DVD (Digital Versatile Disc) video disc is shown.

Figure 11:
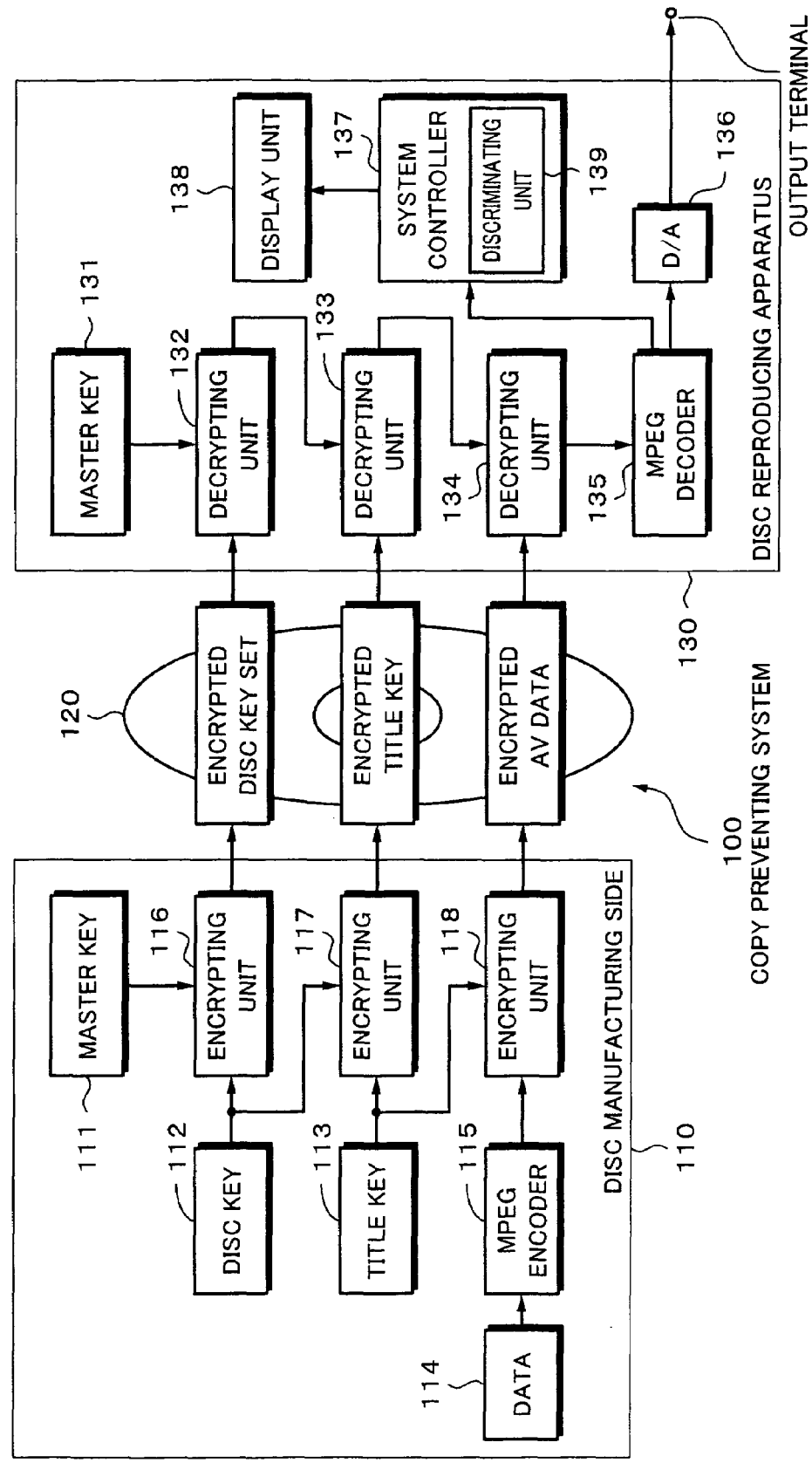
FIG. 11 is a block diagram showing an example of a construction of a copy preventing system according to the fourth embodiment of the invention.

FIG. 11 is a block diagram showing an example of a construction of a copy preventing system 100 according to the fourth embodiment of the invention. As shown in FIG. 11, the copy preventing system 100 according to the fourth embodiment of the invention comprises a disc manufacturing side 110, an optical disc 120, and a disc reproducing apparatus 130. In the fourth embodiment, the optical disc 120 is a DVD video disc.

First, the disc manufacturing side 110 will be described. As shown in FIG. 11, the disc manufacturing side 110 comprises a master key generating unit 111, a disc key generating unit 112, a title key generating unit 113, a data generator 114, an MPEG encoder 115, and encrypting units 116, 117, and 118.

The master key generator 111 generates a master key. The master key is a key which is selected every manufacturer of the disc reproducing apparatus for decrypting the contents.

The disc key generator 112 generates a disc key. The disc key is a key which is freely selected every optical disc by a copyright administrator.

The title key generating unit 113 generates a title key. The title key is a key which is freely selected by a copyright holder every title stored in the optical disc.

The data generator 114 generates AV contents as main data which is recorded onto the optical disc 120. The data generator is, for example, a reproducing apparatus for reproducing AV contents recorded on a master tape or the like.

The MPEG encoder 115 encodes the AV contents which is supplied from the data generator 114 by MPEG2 and supplies it to the encrypting unit 118.

The encrypting unit 116 encrypts the disc key by the master key and converts it into an encrypted disc key set. The encrypted disc key set is stored into a lead-in area which cannot be accessed by the user on the optical disc 120.

The encrypting unit 117 encrypts the title key by the disc key. The encrypted title key is stored into a sector header area which cannot be accessed by the user.

The encrypting unit 118 encrypts the AV contents compressed by the MPEG encoder by the title key.

The disc reproducing apparatus 130 will now be described. As shown in FIG. 11, the disc reproducing apparatus 130 comprises a master key generating unit 131, decrypting units 132, 133, and 134, an MPEG decoder 135, a D/A unit 136, a system controller 137, and a display unit 138.

The master key generator 131 generates a master key. The decrypting unit 132 decrypts the encrypted disc key set read out from the lead-in area on the optical disc 120 by the master key, obtains the disc key, and supplies it to the decrypting unit 133.

The decrypting unit 133 decrypts the encrypted title key read out from the sector header area on the optical disc 120 by the disc key which is supplied from the decrypting unit 132, obtains the title key, and supplies it to the decrypting unit.

The decrypting unit 134 decrypts the encrypted AV data by the title key which is supplied from the decrypting unit 133 and supplies it to the MPEG decoder 135.

The MPEG decoder 135 decodes the AV data which is supplied from the decrypting unit 134 and supplies it to the D/A unit 136.

The D/A unit 136 D/A converts the AV data which is supplied from the MPEG encoder 135 and supplies it to a display apparatus such as a television receiver or the like via an output terminal.

The system controller 137 displays reproducing time or the like on the basis of the time data which is supplied from the MPEG decoder 135. The system controller 137 has a validity discriminating unit 139. The validity discriminating unit 8 discriminates validity of the time data which is supplied from the MPEG encoder 135. In the first embodiment of the invention, the discrimination of the validity of the time data is made on the basis of whether the time data is continuous or not. The time data which is supplied from the MPEG encoder 135 to the system controller 137 is, for example, a PTS (Presentation Time Stamp), a DTS (Decoding time Stamp), or the like.

The display unit 138 displays the time information, the error message, or the like on the basis of a signal which is supplied from the system controller 137.

Figure 12:
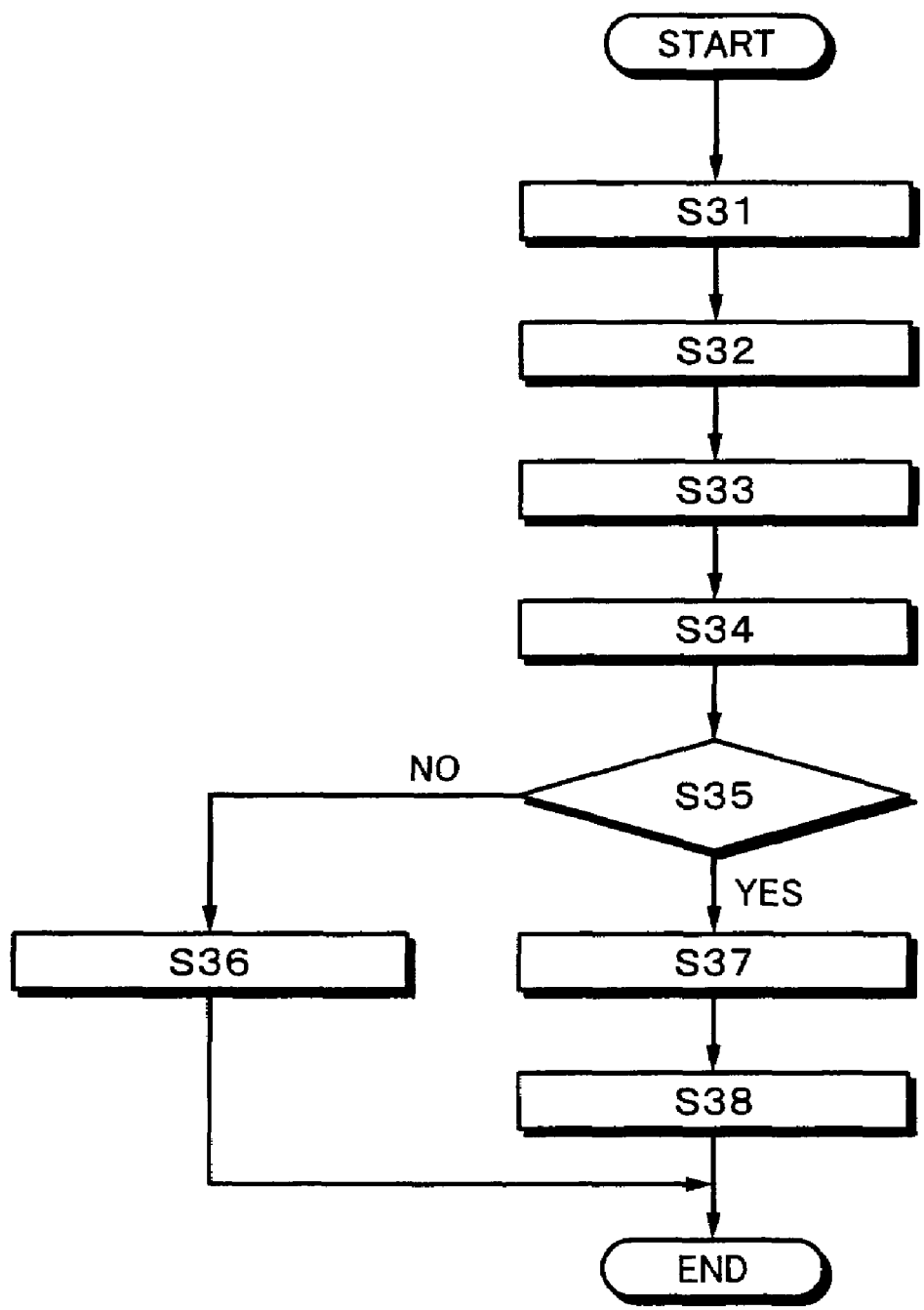
FIG. 12 is a flowchart for explaining a disc reproducing process of the disc reproducing apparatus according to the fourth embodiment of the invention.

FIG. 12 is a flowchart for explaining a disc reproducing process of the disc reproducing apparatus according to the fourth embodiment of the invention. First, in step 31, the decrypting unit 132 decrypts the encrypted disc key set read out from the lead-in area on the optical disc 120 by using the master key allocated in the disc reproducing apparatus and obtains the disc key.

Subsequently, in step 32, the decrypting unit 133 decrypts the encrypted title key read out from the sector header area on the optical disc 120 by using the disc key obtained in step 31 and obtains the title key.

Subsequently, in step 33, the decrypting unit 134 decrypts the encrypted AV data read out from the optical disc 120 by using the title key obtained in step 32 and supplies it to the MPEG decoder 135.

Subsequently, in step 34, the MPEG decoder 135 decodes the AV data supplied from the decrypting unit 134, supplies image data and audio data included in the decoded data to the D/A unit 136, and supplies the time data to the system controller 137.

Subsequently, in step 35, the validity discriminating unit 139 discriminates validity of the supplied time data. If it is determined that the time data is valid, the AV data outputted from the MPEG decoder 135 is supplied to the display apparatus such as a television receiver or the like via the output terminal in step 36. If it is determined that the time data is invalid, the output generated from the MPEG decoder and the D/A unit in step 37. The error message is displayed in the display unit 138 in step 38.

As mentioned above, according to the fourth embodiment of the invention, the validity discriminating unit 139 discriminates the validity of the decrypted time data. If it is determined that the time data is invalid, the output of the decrypted image data and audio data is suppressed. Therefore, even if the recording data is decrypted by a key different from the disc key used for the encryption of the data, it is possible to prevent unsatisfactory image data and noises from being outputted from the disc reproducing apparatus 130 to the external apparatus. Even if the decrypting unit 134 has erroneously executed the decrypting process, it is possible to prevent the unsatisfactory noises from being outputted from the disc reproducing apparatus 130 to the external apparatus. Therefore, since grace and quality of the disc reproducing apparatus 130 are not lost due to the unsatisfactory image data output and noise output, the user can use the disc reproducing apparatus at ease.

Although the embodiments of the invention have specifically been described above, the invention is not limited to the foregoing embodiments but various modifications based on the technical idea of the invention are possible.

In the foregoing first, second, third, and fourth embodiments, the example in which the invention is applied to the disc reproducing apparatuses for reproducing the optical disc such as super audio CD, DVD video, or the like has been shown. However, the invention is not limited to them. That is, the invention can be applied to any reproducing apparatus which reproduces a recording medium on which data which has been encrypted by a predetermined key has been recorded. For example, the invention can be applied to a reproducing apparatus which reproduces a non-volatile memory medium.

Figure 13A:
FIG. 13A is a schematic diagram showing another shape example (part 1) of a pit shape in a lead-in portion of the optical disc according to the first, second, and third embodiments of the invention.

In the foregoing first, second, and third embodiments, the case of recording the disc key into the lead-in portion by decreasing the pit width at a position which is away from the edge of the pit by the predetermined distance has been mentioned. However, the recording method of the disc key is not limited to it. For example, as shown in FIG. 13A, the disc key can be also recorded into the lead-in portion by decreasing the pit width at a center of each pit with respect to the pit which is equal to or longer than a predetermined length.

Figure 13B:
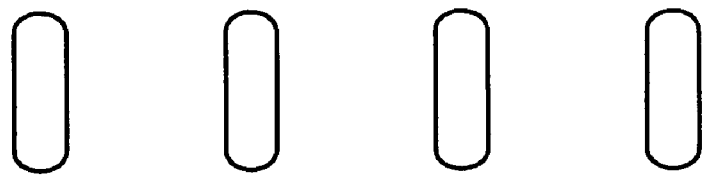
FIG. 13B is a schematic diagram showing another shape example (part 2) of the pit shape in the lead in portion of the optical disc according to the first, second, and third embodiments of the invention.

In the foregoing first, second, and third embodiments, the case of recording the disc key into the lead-in portion by locally decreasing the pit width has been shown. However, as shown in FIG. 13B, the disc key can be also recorded into the lead-in portion by locally increasing the pit width.

Figure 13C:
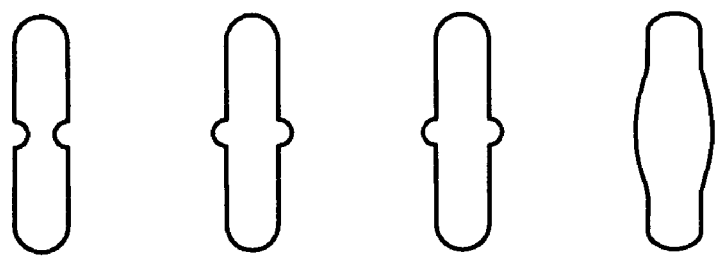
FIG. 13C is a schematic diagram showing another shape example (part 3) of the pit shape in the lead-in portion of the optical disc according to the first, second, and third embodiments of the invention.

Further, as shown in FIG. 13C, the disc key can be also recorded by a ternary value by locally increasing and decreasing the pit width. Moreover, it is also possible to set a degree of such an increase and a degree of such a decrease step by step and record the disc key by the recording of a multivalue larger than the ternary value.

Figure 13D:
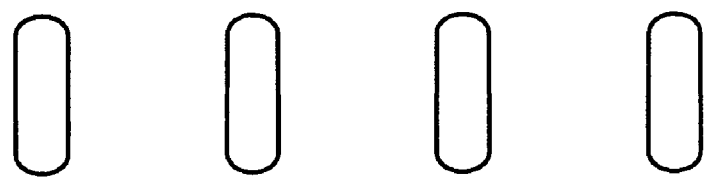
FIG. 13D is a schematic diagram showing another shape example (part 4) of the pit shape in the lead-in portion of the optical disc according to the first, second, and third embodiments of the invention.

In addition, as shown in FIG. 13D, it is also possible to change the pit width for time longer than one period of the channel clock and record data of the width.

In the fourth embodiment, the example in which the invention is applied to the disc reproducing apparatus for reproducing the DVD video has been shown. However, the invention can be also applied to a disc reproducing apparatus which reproduces a DVD audio.

In the foregoing first, second, and third embodiments, the example of discriminating the validity of the disc key on the basis of the time data included in the header portion has been shown. However, the validity of the disc key can be also discriminated on the basis of the time data of the subcode or the like, for example, a movement number of a Q channel, an elapsed time in the movement, or an absolute time.

As described above, according to the invention, the detecting means discriminates validity of the decrypted address data and, if the address data is determined to be invalid, the control means inhibits the output of the decrypted main data. Therefore, even if the main data is decrypted by key information different from the key information used for the encryption of the main data and the address data, it is possible to prevent the unsatisfactory data from being outputted from the reproducing apparatus to the external apparatus or the like. Further, even if the presence or absence of the key information is erroneously discriminated, it is possible to prevent the unsatisfactory data from being outputted from the reproducing apparatus to the external apparatus. Moreover, even if the decrypting means erroneously decrypts the data, it is possible to prevent the unsatisfactory data from being outputted from the reproducing apparatus to the external apparatus. Therefore, since grace and quality of the reproducing apparatus are not lost due to the unsatisfactory data output, the user can use the reproducing apparatus at ease.

The verification about whether the key information used for the decryption of the main data and the address data is the same as the key information used for the encryption of the main data and the address data or not can be made on the basis of the encrypted address data instead of the key information itself, so that the reproducing apparatus which can discriminate the validity of the key information can be easily embodied at low costs.

The invention claimed is:

1. A reproducing apparatus for reproducing a recording medium on which main data has been divided into blocks on a unit basis of a predetermined length, address data has been allocated to each of said divided main data blocks, and both of said main data and said address data have been encrypted by predetermined key information and recorded, comprising:
   reproducing means for reproducing said main data and said address data from said recording medium;
   decrypting means for decrypting, by using predetermined key information, the encryption of the main data and the address data reproduced by said reproducing means;
   detecting means for detecting validity of the address data decrypted by said decrypting means,
   wherein said detecting means detects the validity of the address data decrypted by said decrypting means on the basis of whether the address data is continuous, and
   wherein verification of whether a disc key used for the decryption is a same key as the disc key used for the encryption of the data is made on the basis of the validity of encrypted address data rather than the disc key itself,
   wherein the validity of the address data is performed on the basis of whether the address data is continuous and whether the address data is equal to a value in a valid range, and
   wherein the validity of the data is performed on the basis of whether the address data at a predetermined position is the address data that was inherently recorded at the predetermined position by an optical disk; and
   suppressing means for inhibiting an output of the main data decrypted by said decrypting means if it is determined by said detecting means that the address data decrypted by said decrypting means is invalid.

2. A reproducing apparatus according to claim 1, wherein said address data is an elapsed time of said main data.

3. A reproducing apparatus according to claim 2, wherein said detecting means detects the validity of the address data decrypted by said decrypting means on the basis of whether predetermined address data is obtained or not.

4. A disc reproducing apparatus for reproducing a disc on which main data has been divided into blocks on a unit basis of a predetermined length, address data has been allocated to each of said divided main data blocks, and both of said main data and said address data have been encrypted by predetermined key information and recorded, comprising:
   reproducing means for reproducing said main data and said address data from said disc;
   decrypting means for decrypting, by using predetermined key information, the encryption of the main data and the address data reproduced by said reproducing means;
   detecting means for detecting validity of the address data decrypted by said decrypting means,
   wherein said detecting means detects the validity of the address data decrypted by said decrypting means on the basis of whether the address data is continuous, and
   wherein verification of whether a disc key used for the decryption is a same key as the disc key used for the encryption of the data is made on the basis of the validity of encrypted address data rather than the disc key itself,
   wherein the validity of the address data is performed on the basis of whether the address data is continuous and whether the address data is equal to a value in a valid range, and
   wherein the validity of the data is performed on the basis of whether the address data at a predetermined position is the address data that was inherently recorded at the predetermined position by an optical disk; and
   control means for inhibiting an output of the main data decrypted by said decrypting means if it is determined by said detecting means that the address data decrypted by said decrypting means is invalid.

5. A disc reproducing apparatus according to claim 4, wherein said address data is an elapsed time of said main data.

6. A disc reproducing apparatus according to claim 5, wherein said detecting means detects the validity of the address data decrypted by said decrypting means on the basis of whether predetermined address data is obtained or not.

7. A disc reproducing apparatus according to claim 4, wherein a shape of a part of an emboss pit formed on said disc has been deformed and the key information has been modulated and embedded in the shape change portion.

8. A disc reproducing apparatus according to claim 4, wherein said main data is audio data and said control means executes a muting process to the main data decrypted by said decrypting means.

9. A disc reproducing apparatus according to claim 4,
   wherein the key information for encrypting said main data and said address data is a title key, said title key has been encrypted by a disc key and recorded in a first area which cannot be accessed by the user on said disc, and said disc key has been encrypted by a master key and recorded in a second area which cannot be accessed by the user on said disc.

10. A disc reproducing apparatus according to claim 4,
    wherein the key information for encrypting said main data and said address data is a title key, said title key has been encrypted by a media key and recorded in a first area which cannot be accessed by the user on said disc, and said media key has been encrypted by a device key and recorded in a second area which cannot be accessed by the user on said disc.

11. A disc reproducing apparatus according to claim 9, wherein said first area is a sector header area and said second area has been stored in a lead-in area.

12. A disc reproducing apparatus according to claim 9, wherein said master key has been stored in memory means in said reproducing apparatus.

13. A disc reproducing apparatus according to claim 10, wherein said first area is a sector header area and said second area has been stored in a lead-in area.

14. A disc reproducing apparatus according to claim 10, wherein said device key has been stored in memory means in said reproducing apparatus.

15. A reproducing method of reproducing a recording medium on which main data has been divided into blocks on a unit basis of a predetermined length, address data has been allocated to each of said divided main data blocks, and both of said main data and said address data have been encrypted by predetermined key information and recorded, comprising:

a reproducing step of reproducing said main data and said address data from said recording medium;

a decrypting step of decrypting, by using predetermined key information, the encryption of the main data and the address data reproduced in said reproducing step;

a detecting step of detecting validity of the address data decrypted in said decrypting step, wherein in said detecting step, the validity of the address data decrypted in said decrypting step is detected on the basis of whether the address data is continuous, and wherein verification of whether a disc key used for the decryption is a same key as the disc key used for the encryption of the data is made on the basis of the validity of encrypted address data rather than the disc key itself, wherein the validity of the address data is performed on the basis of whether the address data is continuous and whether the address data is equal to a value in a valid range, and wherein the validity of the data is performed on the basis of whether the address data at a predetermined position is the address data that was inherently recorded at the predetermined position by an optical disk; and a suppressing step of inhibiting an output of the main data decrypted in said decrypting step if it is determined in said detecting step that the address data decrypted in said decrypting step is invalid.

16. A reproducing method according to claim 15, wherein said address data is an elapsed time of said main data.

17. A reproducing method according to claim 16, wherein in said detecting step, the validity of the address data decrypted in said decrypting step is detected on the basis of whether predetermined address data is obtained or not.

* * * * *